UNITED STATES PATENT OFFICE.

JOHN GORDON HUME, OF DUNS, SCOTLAND.

MEANS FOR USE IN CHEMICAL ANALYSIS.

1,087,239.  Specification of Letters Patent.  Patented Feb. 17, 1914.

No Drawing.  Application filed September 7, 1911.  Serial No. 648,239.

*To all whom it may concern:*

Be it known that I, JOHN GORDON HUME, subject of the King of Great Britain and Ireland, residing at Duns, in the county of Berwick, Scotland, have invented new and useful Improvements in Means for Use in Chemical Analysis, of which the following is a specification.

My said invention has for its object to provide means for conducting chemical testing in a simple, convenient and economical manner.

Among other advantages obtained by the use of my invention is that it lends itself specially to extemporaneous (such as clinical or factory) testing, and where testing is undertaken on infinitesimal quantities, it lends itself to general laboratory chemical analysis. Employed in the practice of medicine, for example, on the urine of a patient, the test may be made clinically; and employed in connection with any art or industry the test may be made *in situ*, at any part of the works or plant, without removal of the sample for testing by existing laboratory means, thereby saving much inconvenience and loss of time.

In carrying out my invention the apparatus consists of a capillary tube, of comparatively small diameter, for example, a tube of about 2 mm. external diameter and $1\frac{1}{4}$ mm. internal diameter has been found, by practice, to give satisfactory results, and the tube is preferably made of fusible glass. This tube is charged with whatever reagent it is intended to employ, the charging operation being effected by simply inserting one end of the tube in the reagent which then flows up the tube by capillary attraction. The tube is now held in a horizontal position to allow of the reagent occupying a central position, and the tube is sealed by fusing each end. The tube thus serves as a convenient holder or receptacle for the reagent. To prevent these tubes being damaged they are, preferably, carried in a protective cover or casing.

When it is desired to make a test, for example, a clinical test of urine, the ends of the tube, containing the reagent, are broken off, thus allowing the reagent to flow backward and forward in the tube. The tube is now tilted or inclined at a suitable angle so that the reagent flows to one end, and, if desired, a portion may be removed by simply bringing it into contact with any absorbent material, a suitable quantity to retain will occupy about one fourth the length of the tube. This allows of admitting an equal quantity of urine and enables the operator to observe the reaction in a tube which is half-filled. The lower end of the tube is now brought into contact with the surface of the urine and the latter is drawn up into its lumen, while the tube is at the same time so inclined and manipulated that when sufficient has been admitted the tube is raised out of the urine and brought to a horizontal position. When the urine to be tested is turbid to the extent of interfering with the observation and recognition of the reaction, it may be filtered by being scooped up out of the vessel in a miniature cone, composed of blotting paper or the like. A single drop received by the end of the tube from the tip of the filtering cone is an ample quantity for the test. In all cases special care must be taken not to allow air bubbles to interpose between the two fluids. From the general appearance and condition of the combined contents of the tube the operator is enabled to draw certain conclusions.

When the application of heat is necessary to complete a test, the ends, or one of the ends, after being carefully freed from moisture is again fused to allow of its being immersed in hot water, or heat may be applied by simply pouring hot water over the open tube held in a horizontal position.

What I claim is:—

1. A device for making chemical analyses or tests, comprising a transparent capillary tube of substantially uniform diameter throughout its length, the ends of said tube being closed, and a chemical testing reagent contained within said tube.

2. A device for making chemical analyses or tests, comprising a transparent capillary tube, the ends of said tube being closed, and a chemical testing reagent contained within said tube, said reagent being out of contact with the ends of said tube.

3. A device for making chemical analyses or tests, comprising a transparent capillary tube, the ends of said tube being closed, and a chemical testing reagent contained within said tube and partially filling the same, the portion of the tube not occupied by the reagent containing air.

In testimony whereof I have signed my name to this specification in the presence of two subscribing witnesses.

JOHN GORDON HUME.

Witnesses:
 GEORGE PATTERSON,
 JAMES WHITELAW.

Copies of this patent may be obtained for five cents each, by addressing the "Commissioner of Patents, Washington, D. C."